US010102031B2

(12) United States Patent
Gadelrab et al.

(10) Patent No.: US 10,102,031 B2
(45) Date of Patent: Oct. 16, 2018

(54) BANDWIDTH/RESOURCE MANAGEMENT FOR MULTITHREADED PROCESSORS

(71) Applicant: QUALCOMM Incorporated, San Diego, CA (US)

(72) Inventors: Serag Monier Gadelrab, Markham (CA); Christopher Edward Koob, Round Rock, TX (US); Simon Booth, San Diego, CA (US); Aris Balatsos, Markham (CA); Johnny Jone Wai Kuan, Toronto (CA); Myil Ramkumar, Richmond Hill (CA); Bhupinder Singh Pabla, Brampton (CA); Sean David Sweeney, Firestone, CO (US); George Patsilaras, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/866,012

(22) Filed: Sep. 25, 2015

(65) Prior Publication Data

US 2016/0350152 A1 Dec. 1, 2016

Related U.S. Application Data

(60) Provisional application No. 62/168,708, filed on May 29, 2015.

(51) Int. Cl.
*G06F 9/48* (2006.01)
*G06F 11/07* (2006.01)
*G06F 9/46* (2006.01)

(52) U.S. Cl.
CPC .............. *G06F 9/4818* (2013.01); *G06F 9/46* (2013.01); *G06F 9/4887* (2013.01);
(Continued)

(58) Field of Classification Search
CPC . G06F 9/46; G06F 9/48; G06F 9/4818; G06F 11/0724; G06F 11/07
(Continued)

(56) References Cited

U.S. PATENT DOCUMENTS 6,499,072 B1 * 12/2002 Frank ................... G06F 13/4059
710/100
7,689,998 B1 * 3/2010 Chrysanthakopoulos ..................
G06F 9/4881
718/100
(Continued)

FOREIGN PATENT DOCUMENTS

WO 2010141016 A1 12/2010
WO 2012096652 A1 7/2012

OTHER PUBLICATIONS

International Search Report and Written Opinion—PCT/US2016/029530—ISA/EPO—Aug. 11, 2016.

*Primary Examiner* — Kamini B Patel
(74) *Attorney, Agent, or Firm* — Muncy, Geissler, Olds & Lowe, P.C.

(57) ABSTRACT

Systems and methods relate to managing shared resources in a multithreaded processor comprising two or more processing threads. Danger levels for the two or more threads are determined, wherein the danger level of a thread is based on a potential failure of the thread to meet a deadline due to unavailability of a shared resource. Priority levels associated with the two or more threads are also determined, wherein the priority level is higher for a thread whose failure to meet a deadline is unacceptable and the priority level is lower for a thread whose failure to meet a deadline is acceptable. The two or more threads are scheduled based at least on the determined danger levels for the two or more threads and priority levels associated with the two or more threads.

21 Claims, 5 Drawing Sheets

(52) U.S. Cl.
CPC ........ *G06F 11/079* (2013.01); *G06F 11/0724* (2013.01); *G06F 2209/506* (2013.01)

(58) Field of Classification Search
USPC .................................... 714/38; 718/102–104
See application file for complete search history.

(56) References Cited

U.S. PATENT DOCUMENTS

| | | |
|---|---|---|
| 8,028,286 B2 | 9/2011 | Fedorova |
| 8,091,088 B2* | 1/2012 | Kishan ................... G06F 9/485 |
| | | 718/104 |
| 8,205,206 B2 | 6/2012 | Ozer et al. |
| 8,250,549 B2 | 8/2012 | Reid et al. |
| 8,631,409 B2 | 1/2014 | Danko |
| 8,935,699 B1 | 1/2015 | Vincent et al. |
| 2003/0028582 A1* | 2/2003 | Kosanovic ............. G06F 9/505 |
| | | 718/105 |
| 2008/0134185 A1* | 6/2008 | Fedorova ............... G06F 9/4881 |
| | | 718/102 |
| 2008/0235701 A1* | 9/2008 | Danko .................. G06F 9/4881 |
| | | 718/104 |
| 2008/0295105 A1* | 11/2008 | Ozer ..................... G06F 9/3851 |
| | | 718/103 |
| 2010/0005470 A1 | 1/2010 | Simon et al. |
| 2011/0072178 A1* | 3/2011 | Mace ..................... G06F 13/161 |
| | | 710/244 |
| 2011/0161973 A1* | 6/2011 | Klots ................ G06F 17/30566 |
| | | 718/104 |
| 2013/0007757 A1* | 1/2013 | Chambliss ................ G06F 9/46 |
| | | 718/103 |
| 2014/0082625 A1* | 3/2014 | Busaba ..................... G06F 9/38 |
| | | 718/104 |
| 2014/0173616 A1* | 6/2014 | Bird ........................ G06F 9/50 |
| | | 718/104 |
| 2014/0304709 A1 | 10/2014 | Chandhoke et al. |
| 2016/0117215 A1* | 4/2016 | Gadelrab ............ G06F 11/0742 |
| | | 714/56 |

* cited by examiner

BANDWIDTH/RESOURCE MANAGEMENT FOR MULTITHREADED PROCESSORS

CLAIM OF PRIORITY UNDER 35 U.S.C. § 119

The present application for patent claims priority to Provisional Application No. 62/168,708 entitled "BANDWIDTH/RESOURCE MANAGEMENT FOR MULTITHREADED PROCESSORS" filed May 29, 2015, assigned to the assignee hereof and hereby expressly incorporated by reference herein.

FIELD OF DISCLOSURE

Disclosed aspects relate to processing systems comprising multithreaded processors. More particularly, exemplary aspects relate to resource and bandwidth management of one or more multithreaded processors.

BACKGROUND

Portable computing devices (PCDs) include cellular telephones, portable digital assistants (PDAs), portable game consoles, laptop computers, and other portable electronic devices. PCDs may employ system-on-chip (SOC) architectures which comprise one or more processing cores integrated on the same chip or die. A processing core may have deadlines which, if missed, may cause detectable or visible failures that are not acceptable during operation of the PCD. Such cores are referred to as unacceptable deadline miss (UDM) cores in this disclosure. UDM cores may also be referred to as real time clients/cores (or suitable alternatives known in the art) to convey that deadline misses in real time or during operation of the cores are unacceptable.

In contrast, there may be other cores which may suffer from degradation of performance, but the performance degradation or failures to meet deadlines, for example, may be acceptable. Such cores are referred to as non-UDM cores in this disclosure. Non-UDM cores may also be referred to as non-real time clients/cores or suitable alternatives to convey that deadline misses in real time for the cores are acceptable.

In general, deadlines for a core may be driven by the amount of bandwidth (BW) the core receives from a shared resource such as a memory (e.g., dynamic random access memory (DRAM), internal static random access memory (SRAM) memory (IMEM)), a bus (e.g., peripheral component interconnect express (PCI-e), external transport links), etc., or any shared bandwidth resource. More specifically, the deadlines may be based on the bandwidth made available to the core for a specified period of time. The specified period of time may be relatively small, for example, in the range of 10 to 100 microseconds.

When certain cores do not receive sufficient memory BW over the specified period of time, failures may occur, which may be visible to the user. For example, one of the cores in a PCD may be a display engine which reads data from a memory element (e.g., DRAM) and outputs data to a display panel/device for a user to view. If the display engine is not able to read sufficient data from the DRAM within a fixed period of time, then the display engine may be caused to run out of display data and be forced to display a fixed, solid color (e.g., blue or black) on the display. This is an error condition pertaining to the display engine, and may be referred to in the art as "display underflow," "display underrun" or "display tearing." Such display error conditions are considered to be unacceptable, making the display engine a UDM core.

Another example of an unacceptable failure may involve a camera in the PCD. In general, the camera may receive data from a sensor and write that data to the DRAM. However, if the data received by the camera is not written to the DRAM within a fixed period of time, then the camera may become backed up with received data and start losing input data received from the sensor. This is an error condition for the camera and may be referred to as "camera overflow" or "camera image corruption." The camera error condition can lead to an unacceptable loss of image quality, making the camera a UDM core.

Yet another example of unacceptable failure may relate to a modem core not being able to read/write sufficient data from/to DRAM over a fixed period of time, which can prevent the modem core from completing critical tasks on time. If the critical tasks are not completed within certain deadlines, the modem core's firmware may crash: voice or data calls of a PCD are lost for period of time or an internet connection may appear sluggish (i.e. stuttering during an internet connection). This is an error condition for the modem core which is unacceptable, and so the modem core can also be considered a UDM core.

While the above examples are described as unacceptable deadline misses for particular cores, some cores may be multithreaded processors with two or more parallel processing threads. Multithreaded processors may have additional considerations when it comes to deadline misses. Tasks with unacceptable deadline misses may be run on one or more threads. The threads on which UDM tasks are run may be referred to as UDM threads. Tasks on a UDM thread will lead to unacceptable failure if deadlines are not met. The multithreaded processor may also have one or more non-UDM threads, wherein tasks on non-UDM threads will not lead to unacceptable failures if deadlines are not met.

Managing bandwidths and resources for a multithreaded processor of the PCD which has a mix of UDM and non-UDM threads is challenging. It may be desired to protect UDM threads from being starved of bandwidth/resources by non-UDM threads within the multithreaded processor. Further, a processing system may comprise one or more cores external to the multithreaded processor. Therefore, it may also be desired to protect bandwidth/resources for UDM threads of a multithreaded processor from cores external to the multithreaded processor. Moreover, some processing systems may include more than one multiprocessor, which means that it may also be desired to protect the UDM threads of each multiprocessor from bandwidth/resource degradation.

Accordingly, there is a need in the art for managing bandwidth/resources of a processing system comprising at least one multithreaded processor, wherein the multithreaded processor may comprise at least one UDM thread.

SUMMARY

Exemplary aspects relate to systems and methods for managing shared resources in a multithreaded processor comprising two or more processing threads. The threads can be UDM threads or non-UDM threads. The multithreaded processor can be one of a digital signal processor (DSP), general purpose processor (GPP), or a central processing unit (CPU). An aspect includes determining danger levels for the two or more threads, wherein the danger level of a thread is based on a potential failure of the thread to meet a deadline due to unavailability of a shared resource. An aspect further includes detecting priority levels associated with the two or more threads, wherein the priority level is higher for a thread whose failure to meet a deadline is unacceptable and the priority level is lower for a thread whose failure to meet a deadline is acceptable. In some aspects, grouping transactions from the one or more threads in a scoreboard based on priority levels of the threads allows the scheduling based on priority levels. An exemplary aspect further includes scheduling each of the two or more threads based on an associated danger level and priority level of the thread.

In some aspects, at least one low priority thread (e.g., non-UDM thread) whose failure to meet a deadline is acceptable is throttled. Throttling the low priority thread can mean preventing or delaying scheduling of a low priority transaction from the low priority thread, where the low priority transaction will consume shared resources if scheduled. Further, throttling the low priority thread can also lead to or enable scheduling a high priority transaction from at least one high priority thread (e.g., a UDM thread) whose failure to meet a deadline is unacceptable, wherein shared resources for the high priority thread are made available based on throttling the low priority transaction.

Some aspects include determining the danger levels for the two or more threads based on an internal danger level of the two or more threads and an external danger level of one or more cores of a system comprising the multithreaded processor. For example, the internal danger level can be based on one or more of a danger level provided by a software programmable register programmed with danger levels for each thread, a danger level provided by a timer if the timer expires before a task associated with a thread is completed, a danger level provided by a bandwidth monitor for each thread, or a danger level provided by a latency monitor for each thread.

Accordingly, an exemplary aspect pertains to a method of managing shared resources in a multithreaded processor comprising two or more processing threads, the method comprising determining danger levels for the two or more threads, wherein the danger level of a thread is based on a potential failure of the thread to meet a deadline due to unavailability of a shared resource, detecting priority levels associated with the two or more threads, wherein the priority level is higher for a thread whose failure to meet a deadline is unacceptable and the priority level is lower for a thread whose failure to meet a deadline is acceptable, and scheduling the two or more threads based at least on the determined danger levels for the two or more threads and priority levels associated with the two or more threads.

Another exemplary aspect is related to a processing system comprising a multithreaded processor configured to process two or more processing threads, a danger aggregator configured to determine danger levels for the two or more threads, wherein the danger level of a thread is based on a potential failure of the thread to meet a deadline due to unavailability of a shared resource, a transaction scoreboard configured to track priority levels associated with the two or more threads, wherein the priority level is higher for a thread whose failure to meet a deadline is unacceptable and the priority level is lower for a thread whose failure to meet a deadline is acceptable, and a dequeue engine configured to schedule the two or more threads based at least on the determined danger levels for the two or more threads and priority levels associated with the two or more threads.

Yet another exemplary aspect is related to a processing system comprising multithreaded processing means for processing two or more processing threads, means for determining danger levels for the two or more threads, wherein the danger level of a thread is based on a potential failure of the thread to meet a deadline due to unavailability of a shared resource, means for detecting priority levels associated with the two or more threads, wherein the priority level is higher for a thread whose failure to meet a deadline is unacceptable and the priority level is lower for a thread whose failure to meet a deadline is acceptable, and means for scheduling the two or more threads based at least on the determined danger levels for the two or more threads and priority levels associated with the two or more threads.

Another exemplary aspect is directed to non-transitory computer readable storage medium comprising code, which when executed by a processor, causes the processor to perform operations for managing shared resources in a multithreaded processor comprising two or more processing threads, the non-transitory computer readable storage medium comprising code for determining danger levels for the two or more threads, wherein the danger level of a thread is based on a potential failure of the thread to meet a deadline due to unavailability of a shared resource, code for detecting priority levels associated with the two or more threads, wherein the priority level is higher for a thread whose failure to meet a deadline is unacceptable and the priority level is lower for a thread whose failure to meet a deadline is acceptable, and code for scheduling the two or more threads based at least on the determined danger levels for the two or more threads and priority levels associated with the two or more threads.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1:
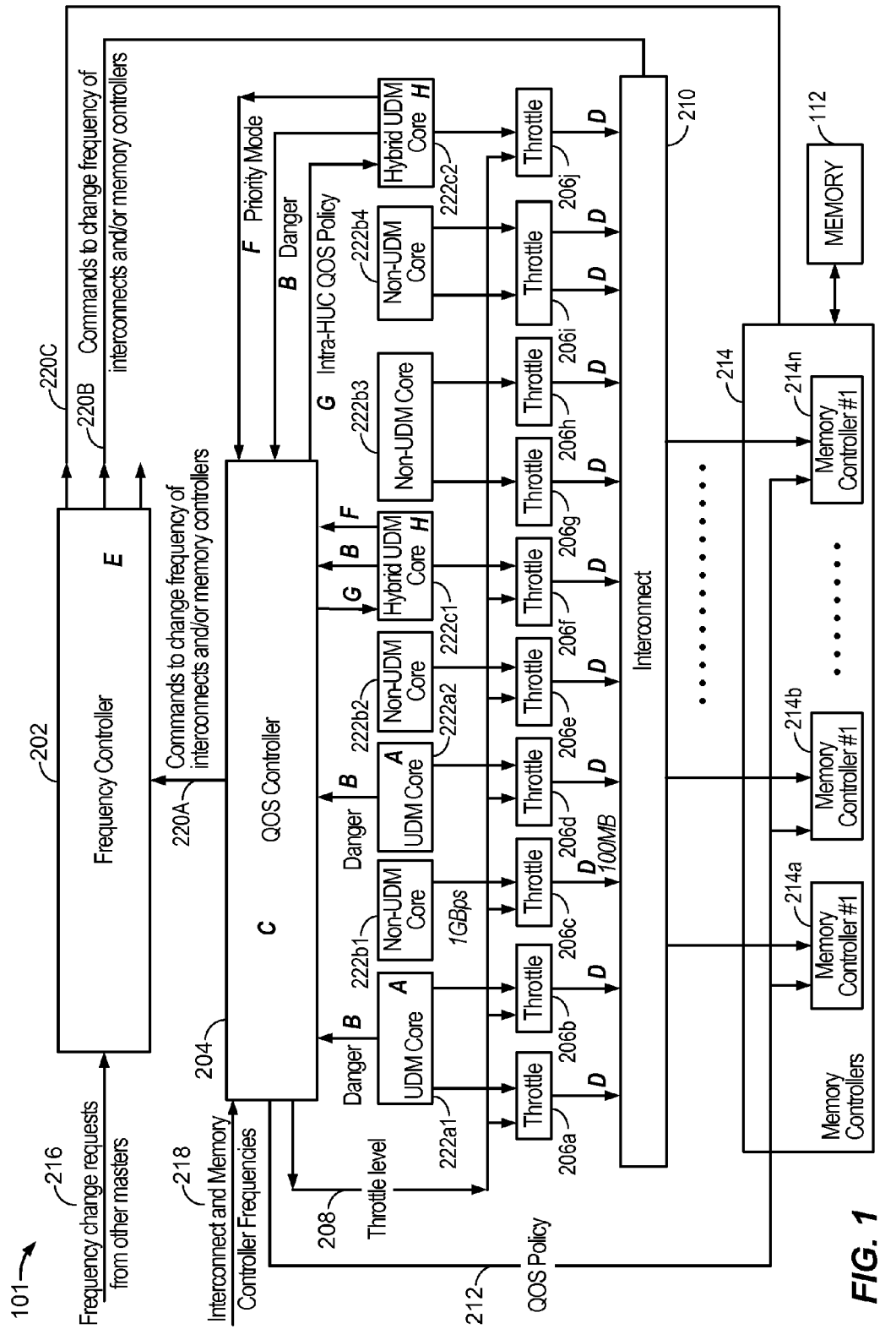
FIG. 1 illustrates a block diagram of an exemplary system within a portable computing device (PCD) for bandwidth engineering/adjusting/shaping/throttling based on danger signals monitored from one or more unacceptable deadline miss (UDM) cores, which may utilize shared resources.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In this disclosure, a multithreaded processor which includes a mix of at least one unacceptable deadline miss (UDM) thread and at least one non-UDM thread is referred to as a hybrid UDM core (HUC). In exemplary aspects, at least one UDM thread and at least one non-UDM thread is capable of executing simultaneously in the HUC. An example of a UDM thread, whose failure or miss of a deadline is unacceptable, is an audio thread of a HUC. An audio thread on which an audio application or task is executed may result in an audible "pop" or sound if the application does not complete on time. This pop is considered to comprise a UDM. An example of a non-UDM thread, whose failure may result in degradation of quality but is not considered unacceptable, is a video encoding thread. A non-UDM video encoding thread which is run simultaneously or concurrently with a UDM audio thread on a HUC, may skip a follow-on frame if an encoding for a current frame is not completed prior to a start of the following or follow-on frame. Skipping the follow-on frame in this manner may result in loss of quality but is not considered to be unacceptable.

In the context of a HUC, the terms threads and cores may be used interchangeably to refer to processing engines which can execute tasks simultaneously. There is no physical separation that is assumed to exist between threads/cores of a HUC or multithreaded processor.

A HUC can be a central processing unit (CPU), digital signal processor (DSP), general purpose processor (GPU), etc., capable of executing two or more processing threads in parallel. The HUC can be one among one or more processing cores of a system-on-chip (SoC), for example, configured as an aforementioned portable computing device (PCD). In exemplary aspects of this disclosure, management of resources/bandwidths of a HUC are described. Since the HUC can include UDM and non-UDM threads, care must be taken to ensure that UDM threads receive sufficient bandwidth/resources so that an unacceptable deadline miss of a UDM thread can be prevented. The UDM threads of a HUC can be throttled or starved of resources/bandwidth by non-UDM threads within the HUC, as well as throttling caused by external elements such as other cores or other HUCs in the PCD. Elements which can throttle a UDM thread/core may be referred to as aggressors.

In exemplary aspects of this disclosure, if a UDM core outside a HUC throttles a HUC (also referred to as external throttling), then systems and methods are employed to throttle non-UDM threads/cores in the HUC while not affecting the UDM threads/cores in the HUC. On the other hand, throttling danger can arise from within a HUC (internal throttling). In the case of internal throttling, a HUC may be designed in exemplary aspects to sense that one or more of its UDM threads/cores are in imminent danger of unacceptable deadline misses due to lack of resources/bandwidth. To avoid throttling the UDM threads/cores in imminent danger, exemplary solutions pertain to throttling one or more of external non-UDM cores or internal non-UDM cores/threads, such that the internal UDM cores/threads are prevented from being throttled.

With reference to FIG. 1, a block diagram of an exemplary processing system 101 is illustrated. Processing system 101 may pertain to or comprise a portable computing device (PCD). Processing system 101 is generally configured for bandwidth throttling based on danger signals monitored from one or more hardware elements, such as cores 222, which may utilize shared resources, like memory 112, interconnect 210, etc. Processing system 101 may comprise a quality of service ("QoS") controller 204 that is coupled to one or more unacceptable deadline miss (UDM) cores generally designated with the reference numeral 222a, comprising UDM cores 222a1 and 222a2. UDM cores 222a1-a2 may cause exemplary error conditions such as, but not limited to, display underflows, camera overflows, dropped telephone calls, sluggish Internet connections, etc. which are considered to be unacceptable in this disclosure. UDM cores 222a1-a2, may comprise a danger level sensor "A" which produces a danger level signal "B," where danger level signal B is received and monitored by QoS controller 204.

Processing system 101 is also shown to include non-UDM cores generally designated with the reference numeral 222b and comprising non-UDM cores 222b1-b4. Non-UDM cores 222b1-b4 are not shown to include danger level sensors A. In some aspects, it is possible for one or more of non-UDM cores 222b1-b4 to have danger level sensors A, however, these sensors A of non-UDM cores 222b1-b4 are either not coupled to the QoS controller 204 or a switch (not illustrated) may be turned off for these danger level sensors A, such that QoS controller 204 does not receive any danger level signals B from these non-UDM cores 222b1-b4.

Additionally, as noted above, processing system 101 also includes hybrid UDM cores (HUCs) generally designated by the reference numeral 222c and comprising HUCs 222c1 and 222c2. HUCs 222c1-c2 also include danger level sensors, which are designated as hybrid danger level sensors H. Hybrid danger level sensors H are also configured to generate danger level signal B received and monitored by QoS controller 204. In addition, HUCs 222c also generate priority mode signals F, received and monitored by QoS controller 204, and receive intra-HUC QoS policy signals G from QoS controller 204. Signals F, G, and H related to HUCs 222c are explained in further detail with reference to FIG. 2 below.

Each UDM-core 222a, non-UDM core 222b, and HUC 222c may be coupled to a traffic shaper or traffic throttle, generally designated with the reference numeral 206 and comprising traffic throttles 206a-j coupled to respective cores 222. Traffic throttle 206 may be coupled to interconnect 210, which can comprise one or more switch fabrics, rings, crossbars, buses etc. as understood by one of ordinary skill in the art. Interconnect 210 may be coupled to one or more memory controllers 214.

Memory controllers generally designated by the reference numeral 214 and comprising memory controllers 214a-n, may be coupled to memory 112. Memory 112 may comprise volatile or non-volatile memory. Memory 112 may include, but is not limited to, DRAM, IMEM, etc. Although not shown, processing system 101 may also include PCI controller coupled to one or more PCI peripherals through a PCI-e external transport.

QoS controller 204 may issue command signals to individual traffic throttles 206 via throttle level command line 208. Similarly, QoS controller 204 may issue memory controller QoS Policy signals to individual memory controllers 214 via memory controller QoS Policy data line 212. QoS controller 204 may also issue commands 220A to change frequency of interconnect and/or memory controllers to frequency controller 202. QoS controller 204 may monitor the danger level signals B generated by UDM cores 222a and HUCs 222c. QoS controller 204 may also monitor interconnect and memory controller frequencies designated as input 218.

Frequency controller 202 may issue frequency change commands to interconnect 210 and memory controllers 214, respectively via command lines 220B and 220C. Frequency controller 202 may receive, as inputs, frequency change requests 216 from masters, such as from UDM cores 222a, non-UDM cores 222b, and HUCs 222c. As noted previously, frequency controller 202 may also receive commands 220A to change frequency for the interconnect 210 and or memory controllers 214 from QoS controller 204.

As discussed above, as one of its inputs, QoS controller 204 receives danger level signals B from UDM cores 222a and HUCs 222c. In addition, QoS controller 204 also receives priority mode signal F from HUCs 222c. Danger level signals B will first be explained to illustrate operation of QoS controller 204. However, a detailed explanation of QoS controller 204, frequency controller 202, and related aspects will be avoided in this disclosure, except as it pertains to HUCs 222c. Applicant's co-pending U.S. patent applications, with Ser. Nos. 14/588,798 and 14/588,812 provide a detailed explanation of processing system 101 for non-HUCs including UDM cores 222a and non-UDM cores 222b.

To provide relevant background for the operation of QoS controller 204 as it pertains to HUCs and non-HUCs (i.e., UDM cores 222a and non-UDM cores 222b), the concept of receiving danger level signals B at QoS controller 204 and management of throttles 206 will now be provided for UDM cores 222a. Danger level signals B may comprise information indicating levels or degrees at which a UDM core 222a believes that it is in danger of not meeting a deadline and/or it is in danger of a failure. The failure may comprise one or more error conditions described above in the background section for hardware devices such as, but not limited to, a display engine, a camera, and a modem. Each danger level signal B may be unique relative to a respective hardware element.

Based on the danger level signals B and interconnect and memory controller frequencies 218, QoS controller 204 determines an appropriate QoS policy for each core 222 (comprising UDM cores 222a, non-UDM cores 222b, and HUCs 222c) being monitored. It will be understood that in aspects of this disclosure, some cores 222 may not explicitly signal or assert a danger level signal B, but as discussed herein, QoS controller 204 may also treat the lack of receiving a danger level signal B from one or more cores 222 as information indicating degree of danger of the one or more cores 222 which did not signal a danger level, e.g., that those one or more cores 222 are not in danger. Thus, as discussed herein, detecting or determining danger levels B not only includes an explicitly asserted danger level signal, but also encompasses cases where a danger level signal B is not explicitly asserted. QoS controller 204 maintains individual QoS policies for each core 222. The application of the QoS policy for each core 222 being monitored is conveyed or relayed via the throttle level command line 208 to each respective throttle 206 which is assigned to a particular core 222. Each traffic throttle 206 adjusts bandwidth from a respective core 222 to match the bandwidth level "D" specified by QoS controller 204 via the throttle level command line 208. In some aspects, the QOS policy conveyed to traffic throttles 206 may also instruct traffic throttles 206 to change the priority of transactions flowing through them to a lower level, such that transactions from UDM cores 222a or HUC cores 222c are given higher priority at downstream shared resources like interconnect 210, memory 112, etc.

In general QoS controller 204 may throttle or alter the priority of the traffic or bandwidth of aggressor cores of cores 222, which may or may not be UDM type hardware elements, keeping in mind that the policy for throttling HUCs 222c is different, and will be based on priority mode signal F, in addition to danger level signal B from the HUCs 222c. By shaping/throttling bandwidth of aggressor cores of cores 222, such as non-UDM cores 222b, for example, UDM cores 222a may receive more bandwidth and/or lower latency transactions from the processing system 101 thereby reducing respective danger levels of respective UDM cores 222a.

Additionally, QoS controller 204 may also determine an appropriate operating frequency "E" for each memory controller 214 as well as for interconnect 210. By increasing the frequency of interconnect 210 and/or one or more memory controllers 214, UDM cores 222a, for example, may receive more operating bandwidth. QoS controller 204 may decrease frequency once it determines that one or more UDM cores 222a are not in danger of failure. Specifically, QoS controller 204 may issue frequency control commands to frequency controller 202 via a frequency command line 220A. Frequency controller 202 may in turn issue frequency change commands on the lines 220B, 220C to interconnect 210 and memory controllers 214.

Exemplary aspects pertaining to bandwidth/resource management of HUCs 222c will now be explained in detail, based on the above description of processing system 101 of FIG. 1. As previously mentioned, two considerations arise in the case of HUCs. A first consideration relates to external throttling. External throttling applies in cases, where, for example, one or more non-HUC UDM cores 222a (e.g., a display engine, as previously mentioned) sense danger and raise danger level signals B, based on which, QoS controller 204 may seek to throttle all bandwidth aggressors, including HUCs 222c. This may effectively result in QoS controller 204 causing throttles 206f and 206j (coupled to HUCs 222c1 and 222c2, respectively) to throttle HUCs 222c1 and 222c2. However, since HUCs 222c may include active UDM and non-UDM threads, where, again the non-UDM threads may themselves be aggressors, the UDM thread as well as the non-UDM aggressor threads of HUCs 222c1-c2 may end up getting throttled. While it is desirable to throttle the non-UDM threads, UDM threads should not be throttled in the course of preventing unacceptable failures from occurring. Therefore, HUCs 222c are designed to throttle the non-UDM threads/cores within the HUCs 222c, without affecting the UDM threads/cores in the following manner.

A second consideration pertains to internal pressures arising from a HUC, for example, when a HUC's UDM thread is in danger of missing a deadline due to resource contention from aggressor non-UDM threads running on the same HUC. The aggressor non-UDM threads may put the UDM thread in danger of unacceptable failure by hogging shared resources. The shared resources may be inside the HUC, e.g., cache, buffers, outstanding transactions, etc. The shared resources may also be outside the HUC, e.g., bandwidths of interconnect 210 or memory 112. In these cases, where HUC 222c1, for example, experiences internal pressures, QoS controller 204 cannot apply throttling via throttle 206f for HUC 222c1, since there is no spatial separation of the UDM and non-UDM threads running concurrently on HUC 222c1.

In order to prevent external and internal influences from throttling UDM threads within a HUC, UDM threads are provided with added resiliency to meet their deadline in the presence of aggressor non-UDM threads, in exemplary aspects.

Figure 2:
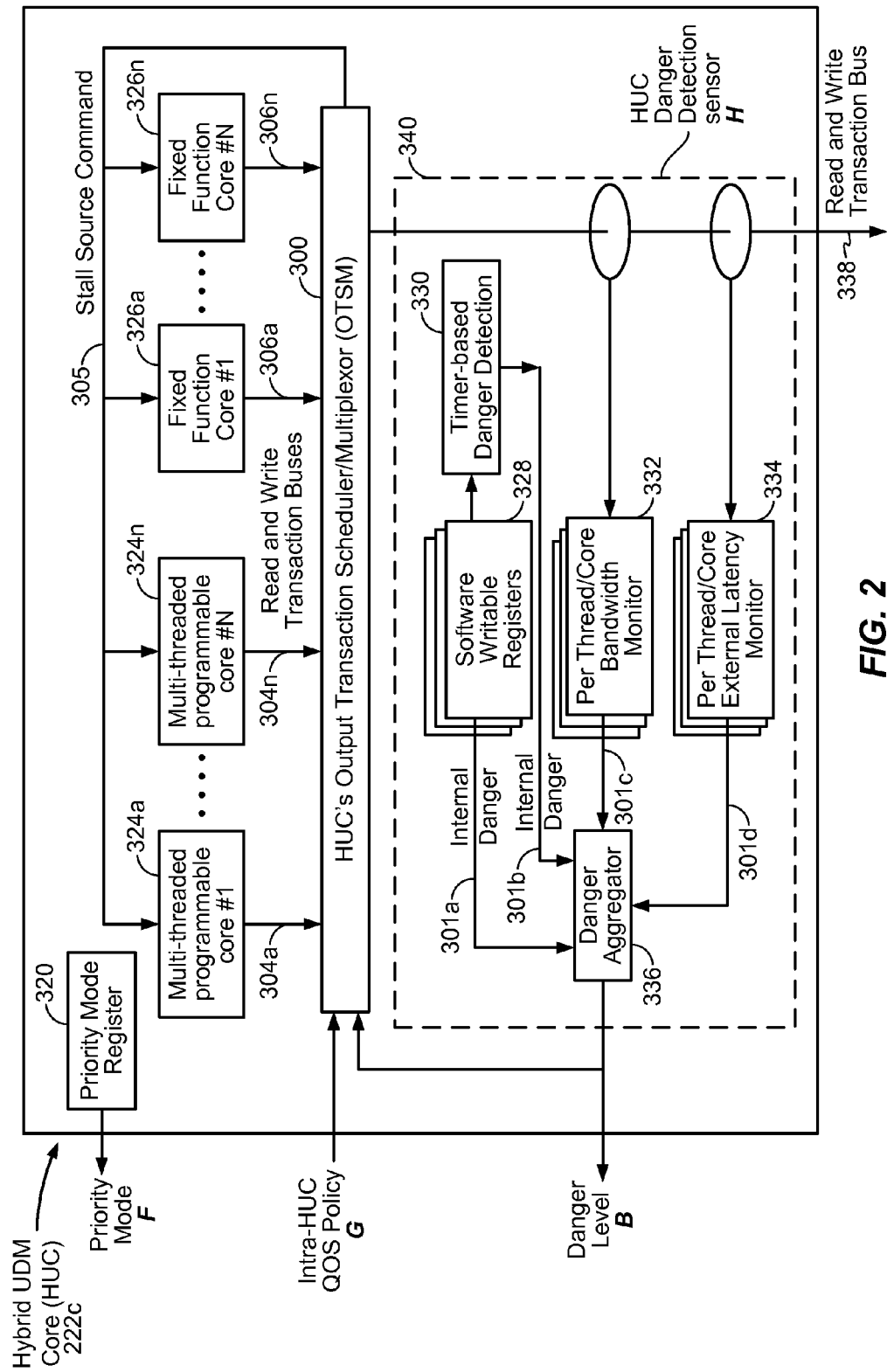
FIG. 2 illustrates a block diagram of a hybrid UDM core (HUC) or multithreaded processor which comprises UDM threads and non-UDM threads.

With reference now to FIG. 2, a block diagram of an exemplary HUC 222c is illustrated. HUC 222c is shown to comprise two or more multithreaded programmable cores designated as 324a-n. Multithreaded programmable cores 324a-n may be configured as a CPU/DSP/GPU, etc., and can have one or more programmable threads, wherein each thread can be a UDM thread or a non-UDM thread. HUC 222c also includes fixed function sub-cores 326a-n, which can comprise UDM sub-cores and/or non-UDM sub-cores. While multithreaded programmable cores 324a-n have threads which are programmable, the fixed function sub-cores 326a-n are sub-cores designed to implement fixed functions.

Priority mode register 320 comprises information regarding a mix of UDM and non-UDM threads/cores. In general, a higher priority may be applicable to a HUC which has a higher composition of UDM threads/cores and a lower priority may be applicable to a HUC with a lower composition of UDM threads/cores. Priority mode F is a signal which is output from priority mode register 320, and provided to QoS controller 204 as shown in FIG. 1. In addition to danger level signal B, QoS controller 204 receives priority mode signal F from HUCs 222c. Priority mode signal F enables QoS controller 204 to evaluate the extent to which HUCs 222c may be throttled. If a HUC 222c2, for example, has a large number of UDM threads (indicated, for example, by a higher value of priority mode signal F), then QoS controller 204 may not apply any throttling to corresponding throttle 206j. On the other hand, if it turns out that HUC 222c1 has a low number of or no UDM cores/threads (as indicated by a low or least value of priority mode signal F), then QoS scheduler 204 may treat HUC 222c1 as a non-UDM core for purposes of throttling and apply larger throttling on throttle 206f. In other aspects, the priority mode signal F may be used by QoS controller 204 as an index to a table that comprises the QoS policy (which governs throttling and/or priority levels) that QoS controller 204 is allowed to apply to the throttle (e.g., throttle 206j) that is coupled to the particular HUC 222c (e.g., HUC 222c2). As previously described, threads/cores may be UDM or non-UDM based on the tasks running on them. A programmable thread may be UDM for some tasks and non-UDM for some other tasks, and therefore, the composition of active UDM threads/cores in a HUC can vary in a dynamic manner.

Multithreaded programmable cores 324a-n and fixed function sub-cores 326a-n output data on respective read and write transaction buses 304a-n and 306a-n. Read and write transaction buses 304a-n and 306a-n are coupled to the HUC's output transaction scheduler/multiplexor (OTSM) 300, which is explained further with reference to FIG. 3. In general, OTSM 300 is configured to receive the various transactions from read and write transaction buses 304a-n and 306a-n, and based on particular danger levels (internal and external), throttle non-UDM threads/cores as necessary, consider various priority levels assigned to the transactions, and prioritize and schedule the transactions to be sent out to interconnect 210, for example, through read and write transactions to interconnect bus 338. Some transactions (e.g., of non-UDM threads/cores) may be stalled or killed by OTSM 300.

The signal stall source command 305 is an output from OTSM 300, which is used to stall any one or more of non-UDM threads/sub-cores of multithreaded programmable cores 324a-n or fixed function sub-cores 326a-n. Stall source command 305 can be temporarily applied to particular threads/cores of multithreaded programmable cores 324a-n and fixed function sub-cores 326a-n, Intra-HUC QoS policy signal G is an output of QoS controller 204, which is input to HUC 222c, and specifically, an input to OTSM 300. Intra-HUC QoS policy signal G conveys an external danger to HUC 222c. For example, QoS controller 204 may receive danger level signals B from one or more UDM cores 222a and/or other HUCs 222c (e.g., HUC 222c1) to determine how much throttling may be applied to non-UDM cores/threads of a particular HUC 222c (e.g., HUC 222c2), once again, keeping in mind that an explicit signal may not be received in some cases to indicate corresponding danger level of a core 222 (e.g., one or more UDM cores 222a and/or one or more HUCs 222c may indicate lack of danger by not asserting an explicit danger level signal).

Another input to OTSM 300 is danger level signal B which is also an output of HUC 222c supplied to QoS controller 204. Danger level signal B is generated within HUC 222c by HUC danger level detection sensor H, designated as block 340 in FIG. 2. HUC danger level detection block 340 can involve various types of danger level detection and includes danger aggregator 336 to provide an aggregated danger level signal B based on the various types of danger levels that can be detected. For example, as shown, danger level signal 301a can be an internal danger signal generated by HUC 222c, which can be provided directly from software writable registers 328 (which may be dynamically programmed or statically set for each thread/core, to indicate that if a UDM thread/core is pending transmission, then danger must be triggered). Additionally, timer-based danger detection block 330 may be used, where software writable registers 328 can set a timer, and if a UDM thread does not disable the timer of HUC 222c prior to the timer expiring, then at the expiry of the timer, for example, danger signal 301b can be set. Hardware based danger triggers can also be provided by per thread/core bandwidth monitor 332 and per thread/core external latency monitor 334. Danger signals 301c can be generated by per thread/core bandwidth monitor 332 if bandwidth available for a UDM thread drops below a certain threshold specific to the thread, for example. Danger signals 301d can be generated by per thread/core external latency monitor 334 if, for example the latency of a transaction for a UDM thread (e.g., time taken for read data to be returned to a UDM thread/core after the corresponding read command is sent out on read and write transaction bus 338) exceeds a predetermined threshold.

Danger level aggregator 336 may aggregate danger signals 301a-d in any suitable manner, for example, a weighted sum, or by implementing a lookup table, or other aggregation/combination mechanism. Danger level signal B output by danger aggregator 336 is provided to both QoS controller 204, as well as OTSM 300, as previously explained. As previously discussed, not all of danger signals 301a-d may be asserted or have an explicit value in some cases, and danger aggregator 336 may take into account lack of assertion of a specific danger signal also into consideration in determining danger levels.

In HUC 222c, each UDM thread/core may detect (e.g., through hardware, software, or a combination thereof) that the UDM thread/core is in danger and conveys corresponding danger level signal B to QoS controller 204 (external to HUC 222c) and to OTSM 300 (internal to HUC 222c) as above. While QoS controller 204 receives and monitors danger level signals B from the various cores 222 of processing system 101, OTSM 300, which is internal to HUC 222c, manages danger internally so as to protect UDM threads/cores from unacceptable failures. OTSM 300 is configured to throttle non-UDM threads/cores from multithreaded programmable cores 324a-n and fixed function sub-cores 326a-n as necessary, to ensure that UDM threads/cores are not in danger.

OTSM 300 will be explained with reference to FIG. 3. OTSM 300 includes traffic scheduler and multiplexors 405, which receives transactions from multithreaded programmable cores 324a-n and fixed function sub-cores 326a-n on respective read and write transaction buses 304a-n and 306a-n. Read and write transactions may also be merged into a single read-write bus as known in the art. Of the transactions received from read and write transaction buses 304a-n and 306a-n, traffic scheduler and multiplexors 405 can forward a first subset, shown as transactions 304x/306x to transaction scoreboard 404. Optionally, a second subset of the transactions received from read and write transaction buses 304a-n and 306a-n, shown as transactions 304y/306y, can bypass transaction scoreboard 404 and be sent directly to output transactions arbiter 407.

The second subset comprising transactions 304y/306y can include, for example, write transactions in some aspects. In these aspects, it is recognized that write transactions may not affect consumption of shared resources in the same way that read transactions will (e.g., in the aforementioned example of a UDM thread/core processing an audio application, shared DRAM bandwidth may be hogged by a non-UDM aggressor thread/core, causing the UDM thread/core to be starved or throttled, leading to an unacceptable audible pop if the read data from the shared DRAM is not received by the audio UDM thread/core in time; a similar problem may not exist in the case of write transactions however).

The first subset of transactions 304x/306x which enter transaction scoreboard 404 will now be considered. Transaction scoreboard 404 implements a two-step process with regard to the first subset of transactions 304x/306x. In a first step of the two-step process, transaction scoreboard 404 is designed to delay transmission of transactions from non-UDM threads of the first subset of transactions 304x/306x. In this regard, transaction scoreboard 404 is configured to group transactions from threads/cores into multiple groups of decreasing priority, such that, in the presence of danger, more delay is applied to lower priority non-UDM threads/cores. Grouping the transactions in this manner allows for slowing down the execution of the non-UDM threads/cores by causing the amount of shared resources (internal and external to HUC 222c) consumed by the non-UDM threads/cores to be reduced. As the danger levels (internal and/or external to HUC 222c) increase, the amount of delay applied to each transaction from non-UDM threads increase.

Figure 3:
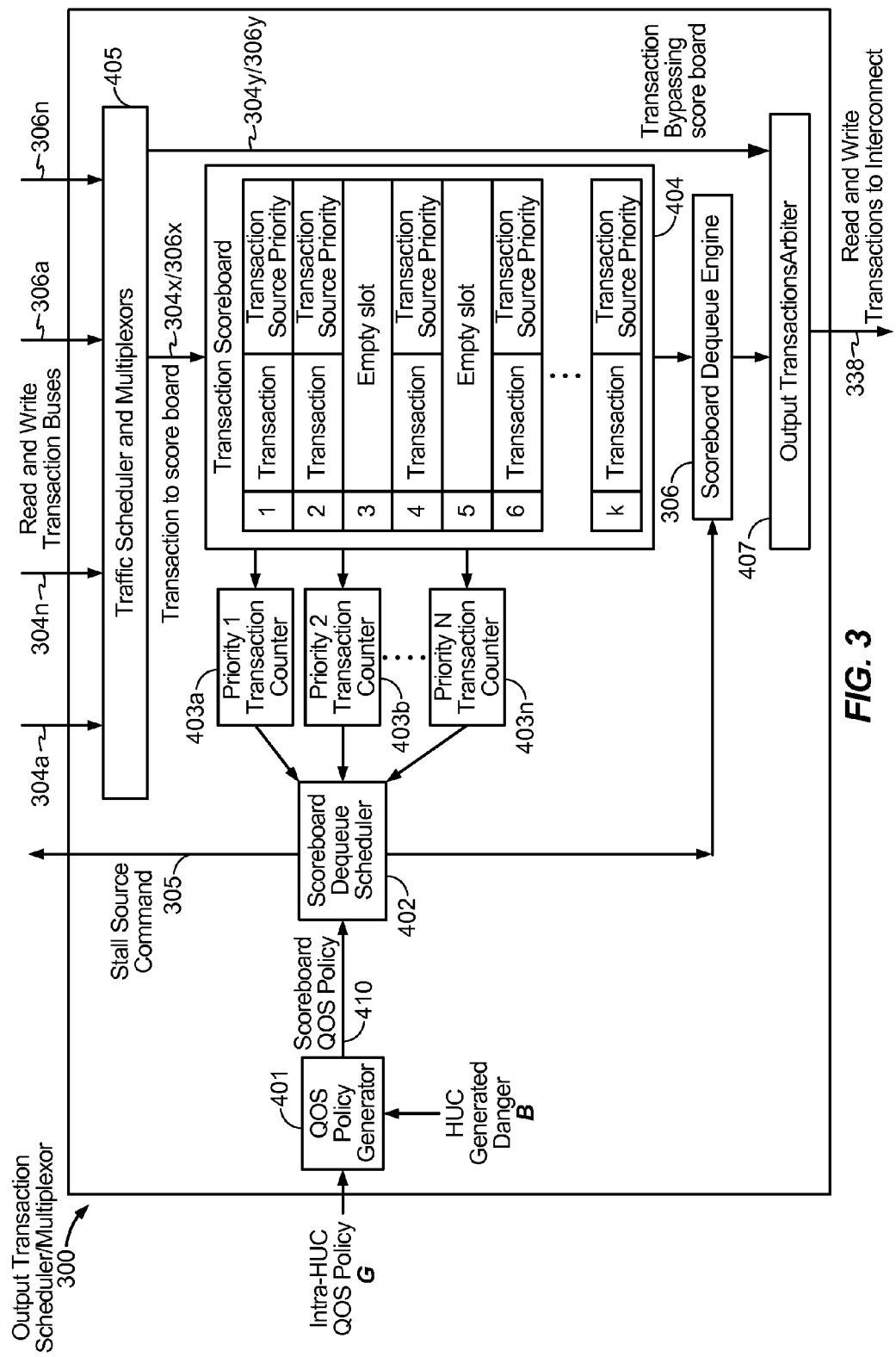
FIG. 3 illustrates a block diagram of an output transaction scheduler/multiplexor of the HUC of FIG. 2.

In further detail, referring to FIG. 3, transaction scoreboard 404 is seen to comprise multiple entries with indices "1-k." Each entry can have a transaction or group of transactions in one field, and an associated priority indicated as "transaction source priority" in another field. Some entries of transaction scoreboard 404 may not have any transactions, and so they are shown as an "empty slot." The order of transactions in transaction scoreboard 404 is not indicative of their priority, and as such, the priority of each transaction is stored in the transaction source priority field. The organization of transaction scoreboard 404 in this manner allows insertion and deletion of transactions from transaction scoreboard 404 in any order and not necessarily in order or arrival. As will be appreciated, highest priority transactions will be UDM threads/cores while non-UDM threads/cores receive lower/lowest priority values in transaction scoreboard 404. It will be understood that while certain transactions may have predetermined priority levels, it is also possible for priority levels of transactions in transaction scoreboard 404 to change over time. For example, a thread/core which pertains to a prefetch operation (i.e., for fetching data from a shared resource such as memory 112, prior to an actual demand for the data) might be low. However, if that same transaction becomes an on-demand fetch (e.g., because a demand for read data from the same address or same cache line as the prefetch operation is received by transaction scoreboard 404) then the priority for that transaction can be increased because it becomes important to obtain the on-demand data to be fetched before an unacceptable deadline miss may occur.

OTSM 300 also includes N counters depicted with reference numerals 403a-n, which respectively count how many transactions there are in transaction scoreboard 404 with priority levels ranging from 1-N. For example, priority 1 transaction counter 403a counts the number of transactions with the highest priority level "1." Similarly, priority N transaction counter 403n counts the number of transactions with the lowest priority level "N".

QoS policy generator 401 is a module which accepts danger level signal B (internal danger) from HUC danger detection sensor H (of FIG. 2) and intra-HUC QoS policy signal G (external danger) and supplies a consolidated danger level on the signal shown as scoreboard QoS policy 410, to scoreboard dequeue scheduler 402. QoS policy generator 401 may be implemented as a lookup table which is indexed by danger level signal B and intra-HUC QoS policy signal G, and the indexed entry may comprise the consolidated danger level, provided as an output from QOS policy generator 401 as scoreboard QoS policy 410. Alternatively QoS policy generator 401 may be implemented as a fixed or programmable logical function or even as a programmable core, such as a micro-controller. In some aspects, QOS policy generator 401 can be a register that is regularly programmed by one of the threads/cores of HUC 222c.

Accordingly, scoreboard dequeue scheduler 402 receives the counts of the number of transactions of the various priority levels from counters 403a-n and the consolidated danger level, scoreboard QoS policy 410, from QoS policy generator 401. Scoreboard dequeue scheduler 402 thus has information on how many transactions/transaction groups are currently pending in transaction scoreboard 404 with the various associated priority levels, as well as the consolidated indication of internal and external danger. Scoreboard dequeue scheduler 402 uses this information to determine which transactions should be dequeued and sent out to output transactions arbiter 407 through scoreboard dequeue engine 306. For example, if the consolidated internal and external danger indication on scoreboard QoS policy 410 is low, then more of low priority (e.g., non-UDM threads/cores) can be dequeued through scoreboard dequeue engine 306. If the consolidated internal and external danger indication on scoreboard QoS policy 410 is high, then low priority (e.g., non-UDM threads/cores) will be delayed while high priority (e.g., UDM threads) will be allowed to be dequeued through scoreboard dequeue engine 306. Accordingly, in some aspects, one or more low priority transactions may be scheduled if the determined danger levels for the two or more threads is low, and one or more high priority transactions may be scheduled while scheduling of one or more low priority transactions is delayed, if the determined danger levels of the two or more threads is high. In cases where scoreboard dequeue scheduler 402 decides to dequeue a transaction from a group of transactions that have the same priority, scoreboard dequeue scheduler 402 may employ arbitration schemes to select one transaction from the group of transactions, where the arbitration schemes can involve round-robin, first-come-first-serve, random selection, or other techniques known in the art.

Output transactions arbiter 407 receives and arbitrates between the transactions to be dequeued from transaction scoreboard 404 through scoreboard dequeue engine 306 and the second subset of transactions 304y/306y which bypass transaction scoreboard 404. Output transactions arbiter 407 sends out read and write transactions to interconnect 338 (e.g., to shared interconnect 210 from FIG. 1) based on the arbitration. For example, if high priority transactions from UDM threads/cores are received from scoreboard dequeue engine 306, output transactions arbiter 407 prioritizes the transactions to be dequeued from transaction scoreboard 404 over the second subset of transactions 304y/306y which bypass transaction scoreboard 404. The first step of the aforementioned two-step process implemented by OTSM 300 to schedule transactions is considered to be completed when transactions are sent out by output transactions arbiter 407 to the bus designated as read and write transactions to interconnect 338.

The second step of the two-step process implemented by OTSM 300 will now be explained. In the second step, scoreboard dequeue scheduler 402 is once again employed. Scoreboard dequeue scheduler 402 is configured to determine if a predetermined number of low priority transactions (e.g., from non-UDM threads/cores) is exceeded, based on the information supplied by counters 403a-n. If the number of transactions in transaction scoreboard 404 from non-UDM threads exceeds the predetermined number, then the execution of these non-UDM threads which are filling up transaction scoreboard 404 with these large numbers of low priority transactions will be stalled. This is particularly the case when the consolidated internal and external danger level indication on scoreboard QoS policy 410 is high. Scoreboard dequeue scheduler 402 generates the aforementioned stall source command 305 (see discussion of FIG. 2) to temporarily stall execution of one or more non-UDM threads on multithreaded programmable cores 324a-n and/or fixed function core 326a-n, until the number of transactions from these low priority threads in transaction scoreboard 404 decreases. As will be recognized, by this process, lower priority non-UDM thread groups are stalled prior to higher priority non-UDM thread groups.

In this manner, HUC 222c comprising UDM threads/cores (also known as real time threads/cores) as well as non-UDM threads/cores (also known as non-real time threads/cores) can enforce a quality of service (QoS) among the threads/cores and schedule/manage the various threads/cores in such a manner that UDM threads/cores are prevented from being throttled or caused to fail in an unacceptable manner. HUC 222c can implement hardware-based solutions for detection and signaling of danger to UDM threads/cores (e.g., as shown and described with reference to FIGS. 2-3) to ensure that the UDM threads/cores do not miss their deadlines even if danger occurs for short periods of time (which may be not be detectable fast enough by software-only mechanisms). As explained, the level of QoS restraint or throttling applied to each thread is a function of the danger level to the thread and the priority of the thread.

Figure 4:
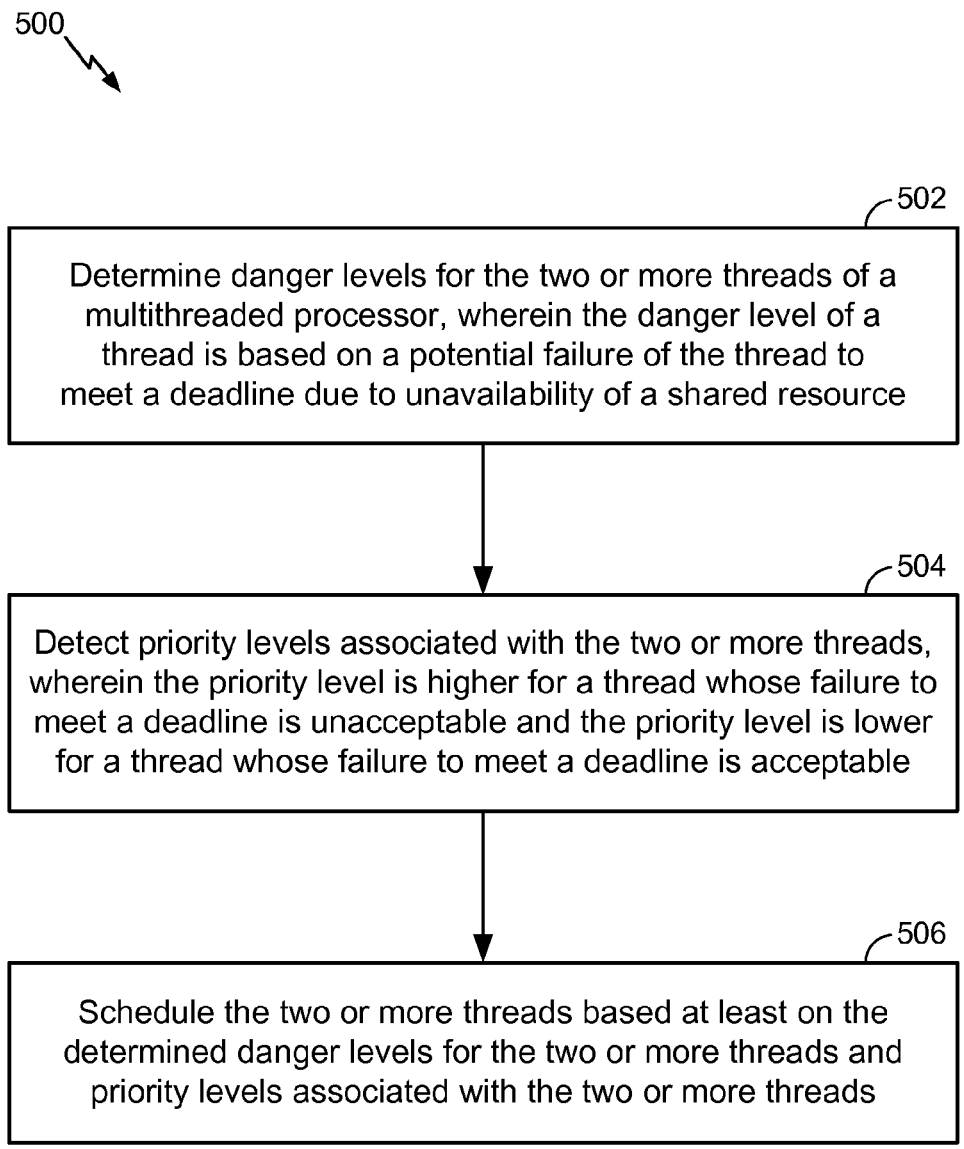
FIG. 4 is a flow chart of a method of managing shared resources in a multithreaded processor.

It will be appreciated that aspects include various methods for performing the processes, functions and/or algorithms disclosed herein. For example, FIG. 4 illustrates a method 500 of managing shared resources in a multithreaded processor (e.g., HUC 222c) comprising two or more processing threads (e.g., UDM threads/cores and non-UDM threads/cores of multithreaded programmable cores 324a-n, fixed function cores 326a-n, etc.). The multithreaded processor can be one of a digital signal processor (DSP), general purpose processor (GPP), or a central processing unit (CPU), for example.

In Block 502, method 500 includes determining danger levels for the two or more threads, wherein the danger level of a thread is based on a potential failure of the thread to meet a deadline due to unavailability of a shared resource. For example, danger aggregator 336 supplies internal danger level of HUC 222c on danger level signal B and external danger level is supplied through intra-HUC QoS policy signal G to OTSM 300. Danger levels for threads are based on likelihood that a thread will be throttled/starved of a shared resource such as interconnect 210, memory 112, etc.

In Block 504, method 500 includes detecting priority levels associated with the two or more threads, wherein the priority level is higher for a thread whose failure to meet a deadline is unacceptable and the priority level is lower for a thread whose failure to meet a deadline is acceptable. In some aspects, grouping transactions from the one or more threads in a scoreboard (e.g., transaction scoreboard 404) based on priority levels of the threads allows the scheduling based on priority levels. For example, transaction scoreboard 404 stores priority levels for various transactions, grouped in order of priority levels. Counters 403a-n count the number of transactions with each priority level and supply them to scoreboard dequeue scheduler 402.

In Block 506, method 500 includes scheduling the two or more threads based at least on the determined danger levels for the two or more threads and priority levels associated with the two or more threads. For example, consolidated internal and external danger levels are provided on the signal scoreboard QoS policy 410 to scoreboard dequeue scheduler 402. Combined with the priority level information from counters 403a-n, scoreboard dequeue scheduler 402 instructs scoreboard dequeue engine 306 to dequeue and schedule the pending transactions in transaction scoreboard 404. The transactions are sent out to interconnect 210, for example, by output transactions arbiter 407.

It will be appreciated that in the illustrated method 500 of FIG. 4, at least one low priority thread (e.g., non-UDM core/thread) whose failure to meet a deadline is acceptable is throttled (e.g., because the low priority or non-UDM thread/core is prevented from being scheduled by scoreboard dequeue scheduler 402, or a thread/core generating a low priority transaction is prevented/stalled from execution by stall source command 305 supplied by scoreboard dequeue scheduler 402). As seen in this context, throttling the low priority thread can mean preventing or delaying scheduling of a low priority transaction from the low priority thread, where the low priority transaction will consume shared resources if scheduled. Further, throttling the low priority thread can also lead to or enable scheduling a high priority transaction from at least one high priority thread (e.g., a UDM thread/core) whose failure to meet a deadline is unacceptable, wherein shared resources for the high priority thread are made available based on throttling the low priority transaction (e.g., interconnect 210/memory 112 may be used for transactions from the UDM threads/cores which are scheduled by throttling the non-UDM threads/cores).

In some aspects of method 500, determining the danger levels for the two or more threads is based on an internal danger level of the two or more threads (e.g., danger level signal B provided by danger aggregator 336) and an external danger level of one or more cores of a system comprising the multithreaded processor (e.g., intra-HUC QoS policy signal G supplied by QoS controller 204), while keeping in mind that one or more internal danger levels or external danger levels may not be explicitly asserted. For example, the internal danger level can be based (e.g., from danger aggregator 336) on one or more of a danger level (e.g., 301a) provided by a software programmable register (e.g., 328) programmed with danger levels for each thread, a danger level (E.g., 301b) provided by a timer (e.g., 330) if the timer expires before a task associated with a thread is completed, a danger level (e.g., 301c) provided by a bandwidth monitor for each thread (e.g., 332), or a danger level (e.g., 301d) provided by a latency monitor for each thread (e.g., 334).

Figure 5:
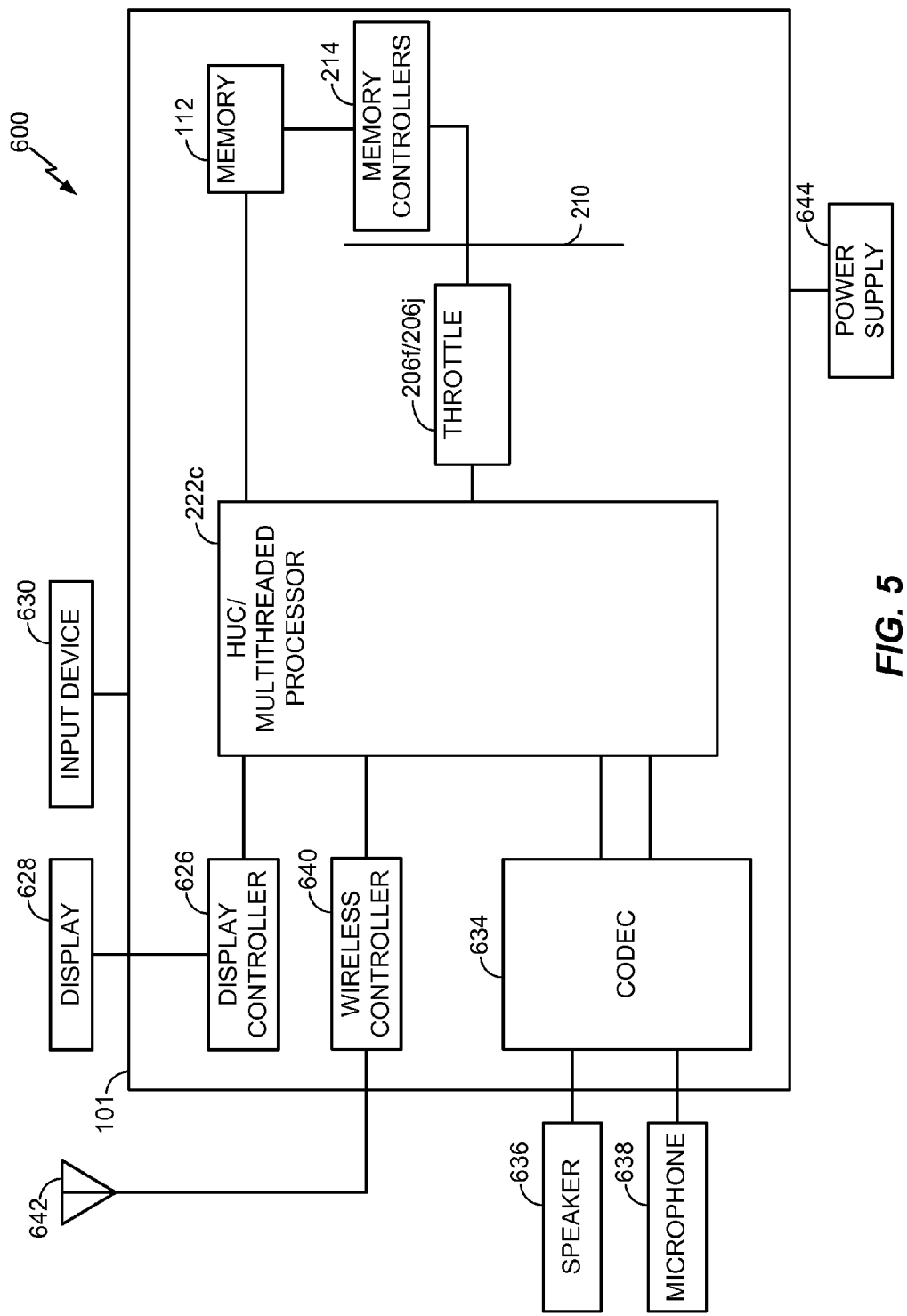
FIG. 5 illustrates an exemplary wireless device or PCD in which an aspect of the disclosure may be advantageously employed.

Referring now to FIG. 5, a block diagram of a wireless device (e.g., a PCD) that is configured according to exemplary aspects is depicted and generally designated 600.

Wireless device or PCD 600 includes certain aspects of processing system 101 of FIG. 1, as will be explained below. Particularly illustrated in wireless device 600 is HUC 222c, which can be configured as a multithreaded processor comprising a mix of UDM threads/cores and non-UDM threads/cores as shown in FIGS. 2-3. HUC 222c can be a DSP, a CPU, a general purpose processor, etc. HUC 222c can be configured to perform the method 500 of FIG. 4. Some aspects of FIG. 1, such as throttle 206f/206j coupled to HUC 222c and to interconnect 210 and memory controllers 214 coupled to interconnect 210 and to memory 112 are representatively shown in FIG. 5, while other aspects of FIG. 1 such as QoS controller 204, frequency controller 202, and related interconnections, have not been shown in FIG. 5, for the sake of clarity, while keeping in mind that the various aspects and details of FIG. 1, although not explicitly shown again in FIG. 5, may be included in wireless device 600. As shown in FIG. 5, HUC 222c may also be directly coupled to memory 112 for some applications (while in exemplary aspects, communication between HUC 222c and memory 112 may be through components such as throttle 206f/206j, interconnect 210, memory controllers 214, etc., configured between HUC 222c and memory 112).

FIG. 5 also shows display controller 626 that is coupled to HUC 222c and to display 628. Coder/decoder (CODEC) 634 (e.g., an audio and/or voice CODEC) can be coupled to HUC 222c. Other components, such as wireless controller 640 (which may include a modem) are also illustrated. Speaker 636 and microphone 638 can be coupled to CODEC 634. FIG. 5 also indicates that wireless controller 640 can be coupled to wireless antenna 642. In some aspects, HUC 222c, display controller 626, memory 112, CODEC 634, and wireless controller 640 (and in some examples, aspects of FIG. 1, such as QoS controller 204, frequency controller 202, various throttles 206, various memory controller 214, interconnect 210, etc.) may be included in processing system 101, which can be configured as a system-in-package or system-on-chip device. Further, in some aspects, display controller 626, wireless controller 640, and CODEC 634 can comprise one or more of cores 222 shown in FIG. 1 (e.g., UDM cores 222a, non-UDM cores 222b, etc.).

In a particular aspect, input device 630 and power supply 644 are coupled to the system-on-chip device or processing system 101. Moreover, in a particular aspect, as illustrated in FIG. 5, display 628, input device 630, speaker 636, microphone 638, wireless antenna 642, and power supply 644 are external to the system-on-chip device or processing system 101. However, each of display 628, input device 630, speaker 636, microphone 638, wireless antenna 642, and power supply 644 can be coupled to a component of the system-on-chip device or processing system 101, such as an interface or a controller.

It should be noted that although FIG. 5 depicts a wireless communications device, HUC 222c and memory 112 may also be integrated into a set-top box, a music player, a video player, an entertainment unit, a navigation device, a personal digital assistant (PDA), a fixed location data unit, a computer, a laptop, a tablet, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for managing/scheduling threads of a multithreaded processor. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of managing shared resources in a multithreaded processor comprising two or more threads, the method comprising:
   determining danger levels for the two or more threads, wherein the danger level of a thread indicates a potential failure of the thread to meet a deadline due to unavailability of a shared resource, wherein the danger levels for the two or more threads are based on an internal danger level associated with the two or more threads and an external danger level associated with one or more cores external to the multithreaded processor;
   detecting priority levels associated with the two or more threads, wherein the priority level is higher for a thread whose failure to meet a deadline is unacceptable and the priority level is lower for a thread whose failure to meet a deadline is acceptable; and
   scheduling the two or more threads based at least on the determined danger levels for the two or more threads and priority levels associated with the two or more threads,
   wherein the scheduling further comprises stalling at least one low priority thread if a number of low priority threads to be scheduled exceeds a predetermined threshold.

2. The method of claim 1, wherein a failure to meet a deadline for the at least one low priority thread is acceptable, wherein stalling the at least one low priority thread comprises preventing or delaying scheduling of a low priority transaction from the at least one low priority thread, wherein the low priority transaction will consume shared resources if scheduled.

3. The method of claim 2, further comprising, scheduling a high priority transaction from at least one high priority thread whose failure to meet a deadline is unacceptable, wherein shared resources for the high priority thread are made available based on stalling the at least one low priority thread.

4. The method of claim 1, wherein the internal danger level is based on one or more of a danger level provided by a software programmable register programmed with danger levels for each thread, a danger level provided by a timer if the timer expires before a task associated with a thread is completed, a danger level provided by a bandwidth monitor for each thread, or a danger level provided by a latency monitor for each thread.

5. The method of claim 4, further comprising providing the internal danger level to a Quality of Service (QoS) controller for managing QoS policies of the one or more cores.

6. The method of claim 1, wherein the external danger level is based on a Quality of Service (QoS) of the one or more cores.

7. The method of claim 1, comprising grouping transactions from the two or more threads in a scoreboard, based on priority levels associated with the two or more threads.

8. The method of claim 1, wherein the multithreaded processor is one of a digital signal processor (DSP), general purpose processor (GPP), or a central processing unit (CPU).

9. The method of claim 1, further comprising stalling the at least one low priority thread for a duration based on the danger levels for the two or more threads.

10. A processing system comprising:
    a multithreaded processor configured to process two or more threads;
    a danger aggregator configured to determine danger levels for the two or more threads, wherein the danger level of a thread indicates a potential failure of the thread to meet a deadline due to unavailability of a shared resource, and wherein the danger levels for the two or more threads are based on an internal danger level associated with the two or more threads and an external danger level associated with one or more cores external to the multithreaded processor of the processing system;
    a transaction scoreboard configured to track priority levels associated with the two or more threads, wherein the priority level is higher for a thread whose failure to meet a deadline is unacceptable and the priority level is lower for a thread whose failure to meet a deadline is acceptable; and
    a dequeue engine configured to schedule the two or more threads based at least on the determined danger levels for the two or more threads and priority levels associated with the two or more threads,
    wherein the dequeue engine is further configured to stall at least one low priority thread if a number of low priority threads to be scheduled exceeds a predetermined threshold.

11. The processing system of claim 10, further comprising, a scheduler configured to throttle the at least one low priority thread, wherein a failure to meet a deadline for the at least one low priority thread is acceptable.

12. The processing system of claim 11, wherein the scheduler is further configured to schedule a high priority transaction from at least one high priority thread whose failure to meet a deadline is unacceptable, wherein resources are shared between the throttled at least one low priority thread and the high priority thread, and wherein the shared resources for the high priority thread are made available based on the at least one low priority thread being stalled.

13. The processing system of claim 12, wherein the shared resources comprise one or more of an interconnect or a memory.

14. The processing system of claim 10, wherein the internal danger level is based on one or more of a danger level provided by a software programmable register programmed with danger levels for each thread, a danger level provided by a timer if the timer expires before a task associated with a thread is completed, a danger level provided by a bandwidth monitor for each thread, or a danger level provided by a latency monitor for each thread.

15. The processing system of claim 14, wherein the danger aggregator is further configured to provide the internal danger level to a Quality of Service (QoS) controller configured to manage QoS policies of the one or more cores of the processing system.

16. The processing system of claim 10, wherein the external danger level is based on a Quality of Service (QoS) of the one or more cores and the multithreaded processor.

17. The processing system of claim 10, wherein the transaction scoreboard is configured to group transactions from the two or more threads, based on priority levels associated with the two or more threads.

18. The processing system of claim 10, wherein the dequeue engine is further configured to stall the at least one low priority thread for a duration based on the danger levels for the two or more threads.

19. The processing system of claim 10, wherein the multithreaded processor is one of a digital signal processor (DSP), general purpose processor (GPP), or a central processing unit (CPU).

20. The processing system of claim 10, integrated into a device selected from the group consisting of a set top box, music player, video player, entertainment unit, navigation device, communications device, personal digital assistant (PDA), fixed location data unit, and a computer.

21. A non-transitory computer readable storage medium comprising code, which when executed by a processor, causes the processor to perform operations for managing shared resources in a multithreaded processor comprising two or more threads, the non-transitory computer readable storage medium comprising:
- code for determining danger levels for the two or more threads, wherein the danger level of a thread indicates a potential failure of the thread to meet a deadline due to unavailability of a shared resource, the danger levels for the two or more threads based on an internal danger level associated with the two or more threads and an external danger level associated with one or more cores external to the multithreaded processor;
- code for detecting priority levels associated with the two or more threads, wherein the priority level is higher for a thread whose failure to meet a deadline is unacceptable and the priority level is lower for a thread whose failure to meet a deadline is acceptable; and
- code for scheduling the two or more threads based at least on the determined danger levels for the two or more threads and priority levels associated with the two or more threads, comprising code for stalling at least one low priority thread if a number of low priority threads to be scheduled exceeds a predetermined threshold.

* * * * *